(12) United States Patent  (10) Patent No.: US 8,267,690 B2
Stennert et al.  (45) Date of Patent: Sep. 18, 2012

(54) SIMULATING DEVICE

(75) Inventors: Håkan Stennert, Bankeryd (SE);
Ingemar Emricson, Bankeryd (SE);
Mats Forselius, Jönköping (SE)

(73) Assignee: Saab AB, Linköping (SE)

( * ) Notice: Subject to any disclaimer, the term of this patent is extended or adjusted under 35 U.S.C. 154(b) by 705 days.

(21) Appl. No.: 11/278,553

(22) Filed: Apr. 4, 2006

(65) Prior Publication Data

US 2006/0228677 A1 Oct. 12, 2006

(30) Foreign Application Priority Data

Apr. 6, 2005 (EP) .................................. 05007501

(51) Int. Cl.
*F41A 33/00* (2006.01)
(52) U.S. Cl. ....... 434/11; 42/1; 89/86; 124/28; 273/348; 348/121; 352/39
(58) Field of Classification Search .................... 434/21, 434/11; 348/121; 42/1; 273/348; 124/28
See application file for complete search history.

(56) References Cited

U.S. PATENT DOCUMENTS

| 3,558,865 | A | | 1/1971 | Berndt et al. | |
|---|---|---|---|---|---|
| 4,624,641 | A | * | 11/1986 | Gallagher | 434/21 |
| 4,752,226 | A | | 6/1988 | Akers et al. | |
| 5,690,492 | A | * | 11/1997 | Herald | 434/20 |
| 6,445,470 | B1 | * | 9/2002 | Jenkins et al. | 359/11 |
| 6,549,872 | B2 | * | 4/2003 | Bollweg et al. | 702/158 |
| 2002/0080434 | A1 | * | 6/2002 | Tanaka | 359/35 |
| 2005/0100338 | A1 | * | 5/2005 | Yeon et al. | 398/78 |
| 2005/0219693 | A1 | * | 10/2005 | Hartkop et al. | 359/462 |
| 2007/0035829 | A1 | * | 2/2007 | Woodgate et al. | 359/462 |
| 2007/0036553 | A1 | * | 2/2007 | Etemad et al. | 398/140 |

FOREIGN PATENT DOCUMENTS

EP 0499683 A2 8/1992

* cited by examiner

*Primary Examiner* — Xuan Thai
*Assistant Examiner* — Banafsheh Hadizonooz
(74) *Attorney, Agent, or Firm* — Venable LLP; Eric J. Franklin

(57) ABSTRACT

A device for simulating fire effects in military or civilian combat training. The device includes a light source configured to produce light beams and a light source control adapted to control a light lobe formed by the light beams from the light source. The light source control includes a two-dimensional array of elements electronically controllable to assume a selected state among at least a first state of letting through light incident thereupon in a main direction of the light lobe or a second state of not letting through the light incident thereupon in the main direction, and a unit adapted to control the elements for designing the spatial propagation of the light lobe.

20 Claims, 3 Drawing Sheets

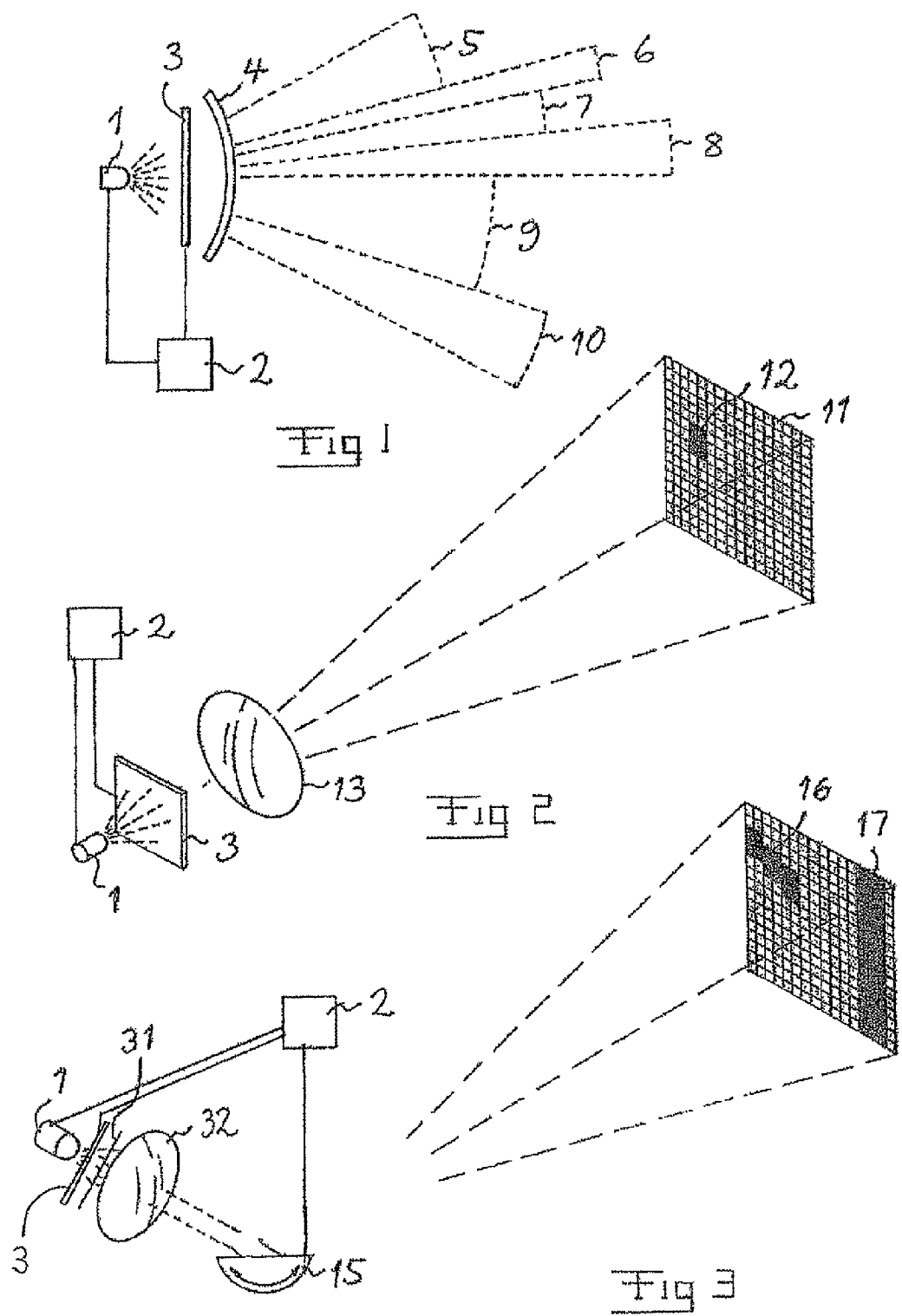

SIMULATING DEVICE

TECHNICAL FIELD OF THE INVENTION

The present invention relates to a device for simulating fire effects in military or civilian combat training, said device comprising a light source and means adapted to control a light lobe formed by light beams from said light source.

Such a device is used when training soldiers in military or civilian combat.

"Simulating fire effects" does here mean simulating the effects of different weapons and military equipment, such as firearms, sector charges and other types of directed fire, in the sense that the device shall cause or assist to cause the same effect on participants, such as soldiers, vehicles or the like, in the military or civilian exercise as would such weapons or equipments have done in a real military or civilian combat.

The information sent out by the light source, for example an infra red light emitting laser, is in the form of a code with the information formed by the length of the time periods between consecutive light pulses. The information may for instance comprise status information such as "you are killed", "you are wounded" etc., intended for equipment receiving the light and treating the information thereof. The equipment is for example a personal detection device worn by a soldier.

Devices of the type defined in the introduction used today have means creating a thin line of laser light, and an expensive mechanical arrangement is used for obtaining a laser lobe formed by sweeping of this line in for instance a horizontal direction. If there also is a desire to obtain sweeping in a direction perpendicular thereto, such as sweeping both in horizontal and vertical direction, a device of this type becomes extremely complicated.

Another disadvantage of a device of that type is that a mechanically controlled sweep also means a restriction of the possibilities to send out information simulating fire effects with respect to time and position as a consequence of the sequential nature of the sweep (for instance from the right to the left and/or from the top to the bottom).

It should also be mentioned that there are two different principles of operation of devices of this type. One is a so-called one-way system transmitting lobe-shaped light pulses containing information being the same irrespectively of what happens with the pulses, i.e. upon what they incide. The other is a so-called two-way system, in which receivers of the light pulses are provided with reflectors, so that the device receives such reflected light and changes the information content of the light transmitted in dependence thereupon.

SUMMARY OF THE INVENTION

One object of the present invention is to provide a device for simulating fire effects in military or civilian combat training of the type defined in the introduction, wherein the information is carried by the light lobe in an alternative way.

This object is according to the invention obtained by providing a device for simulating fire effects of military or civilian combat training comprising a light source and means adapted to control a light lobe formed by light beams from said light source, wherein the light lobe includes information. The control means of the device comprises a two-dimensional array of elements electronically controllable to assume either a first state of letting said light inciding thereupon through in a main direction of said light lobe or a second state of not letting said light inciding thereupon through in said main direction, and a unit adapted to control said elements for designing the spatial propagation of said light lobe.

This means that no complicated and expensive mechanical arrangement is necessary for providing different information to different sections of a predetermined space through said light lobe. Furthermore, more accurate and sophisticated information may in this way easily be obtained by simply controlling the elements of said two-dimensional array. The problems with restrictions with respect to time and position caused by the sequential nature of a sweep may also be eliminated, since there is no need to carry out any mechanically controlled sweep any longer. By controlling elements of such an array a nearly indefinite number of ways to position the transmission of light codes may be obtained.

A simulating device of this type may for instance be arranged close to a virtual sector charge, and when this virtual sector charge "explodes" during military or civilian training there is for instance a wish that soldiers on different locations at the moment of the explosion shall receive different information about the effect of said explosion thereupon. Someone may have been affected, while another soldier was located close to the virtual sector charge but behind a virtual shield or shelter and should therefore still be fit for fight. The device for simulating fire effects in accordance with the invention then provides different sections of a space covered by the light lobe from the light source with different information, since the soldier behind the virtual shield would otherwise receive the same information as other soldiers affected and also be considered to be affected.

Said "letting light through in a main direction" and "not letting light through in said main direction" includes the case of an element being controllable to be substantially transparent and substantially untransparent, for instance by blocking or reflecting said light, with respect to said light as well as elements controllable to guide said light, such as reflect it in a main direction or divert it away from this main direction. This means that blocking and/or reflection properties of said elements of the two-dimensional array may be controlled for obtaining said first and second state thereof. When the states are obtained by changing the reflection of the elements they may in the second state be controlled to reflect said light into a light trap for avoiding disturbing influences of that light.

Said "letting light through in a main direction" and "not letting light through in said main direction" also includes the case of an element being controllable to letting light through in said main direction and to letting light through in one or more directions different from the main direction.

According to a preferred embodiment of the invention the control unit includes a computer program adapted to control said elements of said two-dimensional array, which constitutes an easy way to obtain exactly the control aimed at in each particular use of said device.

According to another preferred embodiment of the invention the device comprises optical means arranged in the path of said light for shaping said light lobe, so that a light lobe with a desired shape may be obtained.

According to another embodiment of the invention said optical means comprises a Fresnel lens, which means that a lobe with a desired shape may be obtained in a simple way.

According to another preferred embodiment of the invention said optical means comprises an optical system of lenses and/or mirrors, so that a high quality in the shaping of said light lobe may be obtained.

According to another preferred embodiment of the invention said optical means comprises a diffractive optical element, i.e. a DOE. This results in a possibility to create a light lobe of a desired shape (within certain limits) out of the light from said light source. The diffractive optical element can be arranged in the beam path either before or after the two-dimensional array.

According to another preferred embodiment of the invention said light source and said array are adapted to make substantially the entire array to be hit by light beams from said light source simultaneously. Such a device will be very simple to the design and sometimes preferred.

According to another preferred embodiment of the invention the device comprises a tiltable mirror arranged in the beam path of said light lobe and means adapted to control said mirror to tilt in a predetermined way, for example for obtaining a sweeping of said light lobe. The tiltable mirror is for example arranged in the beam path after the means adapted to control the light lobe but it can also be arranged in the beam path before the two-dimensional array.

By combining a simple sweeping action of this type with the control of the elements of said array the power consumption of the light source may be reduced remarkably with respect to the case of being forced to simultaneously expose substantially all the elements of said array to light of a power being high enough for the reach required for said light lobe. It will also be possible to dynamically change the properties and the reach of the light lobe in different directions and even to control the light lobe to an optional point or area. Thus, it is not necessary that the mirror during operation of the device is controlled to obtain a sweeping of the light lobe, but this only constitutes a possibility, and it is even conceivable to let the mirror only tilt for obtaining a sweeping of said light lobe across a restricted area of said array or even be fixed when desired in a certain application. Further, by providing a sweeping action, a larger area can be covered by the light lobe than if the light lobe is not sweeping.

It is in this embodiment preferred to have the operation of said control unit and that of said means for controlling the tilting of said mirror coordinated.

According to another preferred embodiment of the invention said two-dimensional array of elements is a liquid crystal array (LCD) and said first and second state of the elements thereof is a state in which they are transparent to said light and a state in which they are not transparent to said light, respectively. Such an array of elements in the form of liquid crystals in a liquid crystal array may efficiently and reliably be electronically controlled for designing the spatial propagation of said light lobe.

According to another preferred embodiment of the invention said elements are micro-mirrors tiltably arranged in an array, and said first state of these micro-mirrors is letting through in said main direction by reflecting the light inciding thereupon in a pre-determined direction and the second state by diverting said light so that dark regions will be created thereby in a cross-section of said light lobe. An advantage of using such micro-mirrors is that a high contrast relationship, i.e. maximum of light in said main direction in the first state/minimum of light in said main direction in the second state, is obtainable, which means that the distance range for the action of the device may be large. This range is defined by the shortest possible distance in said main direction to the device at which said information of the light lobe does not reach a receiver in said second state of the elements and the largest possible distance at which the information of the light lobe may reach a receiver in said first state of the elements. Another advantage of micro-mirrors is that the switch speed thereof is extremely high.

The invention also comprises a computer program containing computer program code means for making a computer or processor control at least the operation of said control unit of a device according to the invention for providing different sections of a space near said light source with different information through said light lobe. It is suitable to control the function of a device according to the invention through such a computer program.

A device according to the invention may also be designed to withstand vibrations and other rough treatment.

Furthermore, the present invention relates to a use of a device according to the invention as part of a shot simulator on a fire-arm. The two-dimensional array may then be arranged to form the light lobe so as to simulate a ballistic trajectory of the simulated ammunition.

The present invention also relates to the use of a device according to the present invention for simulating the effect of a sector charge or another weapon discharging directed fire from a fixed position.

Further features and advantages of the present invention appear from the following description and the other dependent claims.

BRIEF DESCRIPTION OF THE DRAWINGS

With reference to the appended drawings below follows a specific description of preferred embodiments of the invention. In the drawings:

FIG. 1 is a schematic simplified view illustrating the design and the way of functioning of a device according to a first preferred embodiment of the invention, FIG. 2 is a view illustrating a device according to a second preferred embodiment of the invention, FIG. 3 is a view of a device according to a third preferred embodiment of the invention.

DETAILED DESCRIPTION OF PREFERRED EMBODIMENTS OF THE INVENTION

Figure 4:
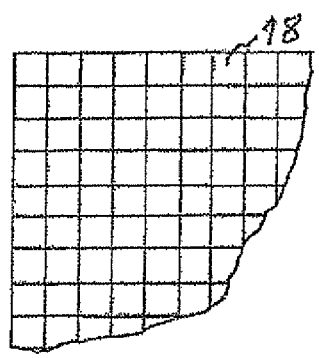
FIG. 4 is a view of a two-dimensional array of elements of a device according to the present invention.

A device for simulating fire effects in military or civilian combat training according to the present invention is schematically shown in FIG. 1. This device comprises a light source, for example in the form of a laser or LED (light emitting diode). In this description a laser 1 adapted to emit infra red laser pulses with a certain power has been chosen as the light source. The device comprises further a unit 2 adapted to control the laser to deliver desired information by determining the intervals between consecutive pulses. A two-dimensional array 3 of elements electronically controllable is arranged in the path of the laser beams from the laser. These elements are controllable to assume either a first state of letting laser light inciding thereupon through in a main direction of a laser lobe formed by laser beams from the laser or a second state of not letting laser light inciding thereupon through in said main direction. The control unit 2 is adapted to. control said elements for designing the spatial propagation of said laser lobe. This control may be carried out so as to change the blocking and/or reflecting properties of the elements. The elements may for instance obtain the two different states by being controllable to be either transparent to laser light or laser light absorbing. The elements may then be liquid crystals and the two-dimensional array of elements 3 is then a liquid crystal array (LCD). It is also possible to arrange said elements with the property to let laser light through in said main direction by reflecting the laser light inciding thereupon in a predetermined direction and not letting laser light inciding thereupon through in said main direction by reflecting it in another direction and by that diverting said laser light, and this will be further described below with reference to FIGS. 4 and 5.

Optical means in the form of a Fresnel lens 4 is arranged in the path of said laser light downstream said array 3 for shaping the laser lobe. It is shown how the Fresnel lens 4 may in this way divide the lobe into individually designed sections 5-10, for example having different widths and reach.

The control unit 2 is provided with a computer program adapted to control the elements of the array 3 for providing different information in different sections of the laser lobe in the way shown by way of example in FIG. 2 for a device according to another embodiment of the invention, where the entire cross-section 11 of the laser lobe except for a small region 12 contains laser light having for instance the information "you are killed". The section 12 may constitute a virtual shield or shelter behind which a soldier participating in a military or civilian exercise of combat may hide. Such a virtual shield may for instance in a military or civilian exercise be marked by a bush, which however would be transparent to the laser light, but this will be taken care of by the array 3.

FIG. 2 schematically illustrates a device according to a second preferred embodiment of the invention, which differs from that shown in FIG. 1 only by a replacement of the Fresnel lens 4 by optical means in the form of an optical system 13 of lenses and/or mirrors which provides another way of obtaining a light lobe than a Fresnel lens.

FIG. 3 illustrates a device according to a third preferred embodiment of the present invention. This device has also a laser 1, a control unit 2 and a two-dimensional array 3 of elements controllable by the control unit to assume either of said two states. However, members 31, 32, in the form of a diffracting optical element (DOE) 31 and a lens 32, are arranged in the path of the laser beams after the laser and said array 3 and adapted to shape said laser beams into a laser lobe having predetermined characteristics. The DOE 31 may be designed to transform or shape the light from the laser 1 into a narrow line, a rectangular shaped lobe, or a lobe having any shape, within certain limits. This device also comprises a tiltable mirror 15 arranged in the path of said laser lobe after the lens 32. The control unit 2 is adapted to control the mirror 15 to tilt for obtaining a sweeping of the laser lobe. This means that the power consumption of the laser 1 may be much lower than in the embodiments shown in FIGS. 1 and 2, since it is not necessary to expose the entire area covered by the lobe simultaneously with a laser light of a certain power per surface unit, but the same laser lobe with the same information may here be obtained by combining the control of the elements of the array 3 and the control of the mirror 15.

In the example shown in FIG. 3 it is illustrated how other areas 16, 17 here shall not receive the information carried by the laser light. The area 17 may for instance simulate a virtual column protecting the soldiers or equipment therebehind.

Figure 8:
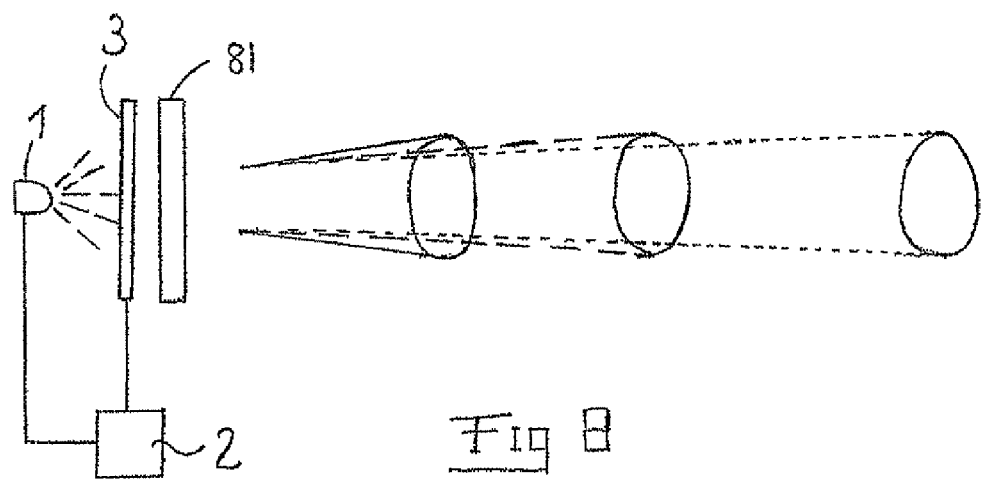
FIG. 8 is a view illustrating a device according to a fourth preferred embodiment of the invention.

FIG. 8 illustrates a device according to a fourth preferred embodiment of the present invention. This device has also a laser 1, a control unit 2 and a two-dimensional array 3 of elements controllable by the control unit 2. One or more optical element 81 is arranged in the path of the laser beams after the laser and said array 3. The laser beams can be controlled via the control unit to provide a laser lobe having a selected reach. The selected reach is obtained by blocking the beams in parts of the optics, wherein the term optics refers to the two-dimensional array and/or the optical element 81. In accordance therewith the control unit 2 is arranged to determine an angle of incidence such that incident angles above the determined angle of incidence should be blocked and incident angles below said determined angle of incidence should be transmitted through the optics in order to provide the selected reach of the laser lobe. The control unit 2 is further arranged to block the parts of the optics on which beams are incident having an angle of incidence exceeding the determined angle of incidence. If a new reach is selected for the laser lobe, a new angle of incidence is determined and those parts of the optics are blocked upon which light is incident with an angle exceeding the new angle of incidence.

Figure 5A:
FIG. 5a is a side elevation of a part of the elements of a two-dimensional array of elements in the form of micro-mirrors in a device according to an embodiment of the present invention.
Figure 5B:
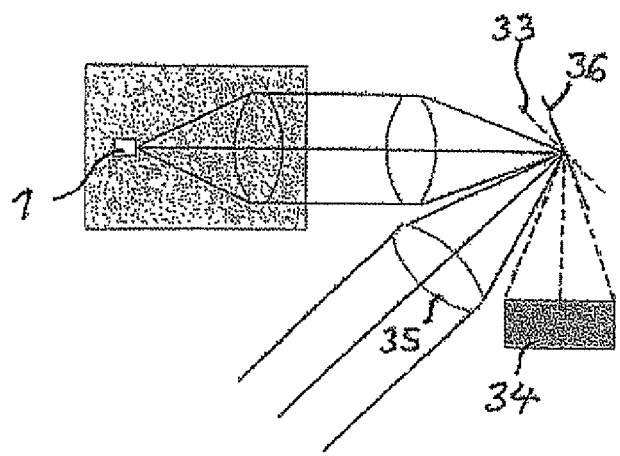
FIG. 5b is a simplified view of a part of a device according to the invention using micro-mirrors as said elements.

FIGS. 4 and 5a illustrate how the elements 18 of said array may instead be micro-mirrors tiltably arranged in an array. The first state of these micro-mirrors is letting through in said main direction by reflecting the laser light inciding thereupon in a predetermined direction (the state of the micro-mirror 18'), and the second state is not letting through in said main direction by diverting said laser light so that dark regions will be created thereby in a cross-section of said laser lobe, which is obtained by tilting the micro-mirrors with respect to the micro-mirrors in the first state, as shown for the micro-mirrors 18" in FIG. 5a. FIG. 5b illustrates schematically how a micro-mirror in a second state (dashed lines 33) may reflect the light into a light absorbing member 34 adapted to absorb the light so that it is not scattered or reflected and then may reach a lens 35 intended for light reflected in said first state (solid line 36) of the micro-mirror.

Figure 6:
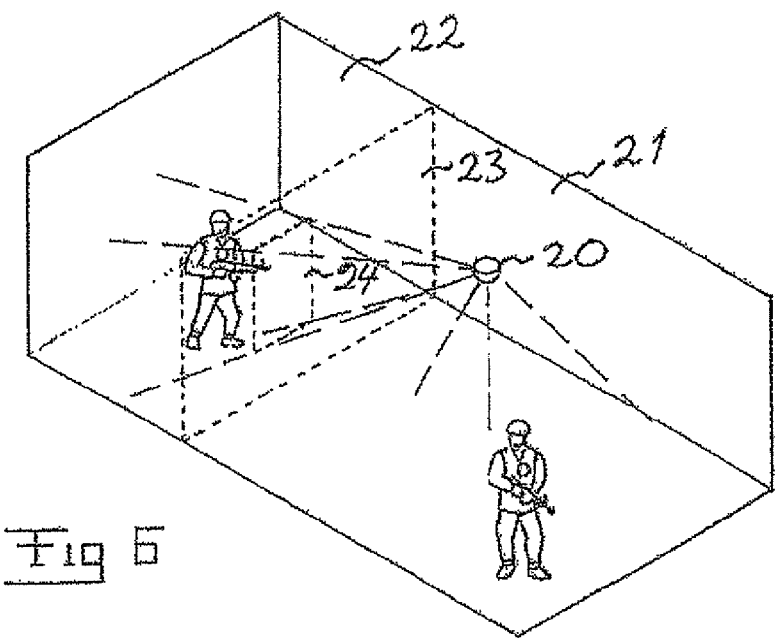
FIGS. 6-7 are schematic views illustrating different possible applications of devices according to the present invention.

FIG. 6 illustrates a possible use of a device 20 according to the present invention in a military or civilian exercise of combat. In this case 20 may stand for more than one such device for covering the entire space, which is two rooms 21, 22 of a building separated by a virtual wall 23. The device or devices "knows" in this case that a grenade has made a hole 24 through the wall 23, so that a soldier located near this hole shall be considered to be reached by any type of fire for effect reaching this hole 24. However, the regions behind the rest of the virtual wall 23 shall not be influenced by such fire for effect, and the control unit of the device 20 will control said two-dimensional array of elements accordingly.

Figure 7:
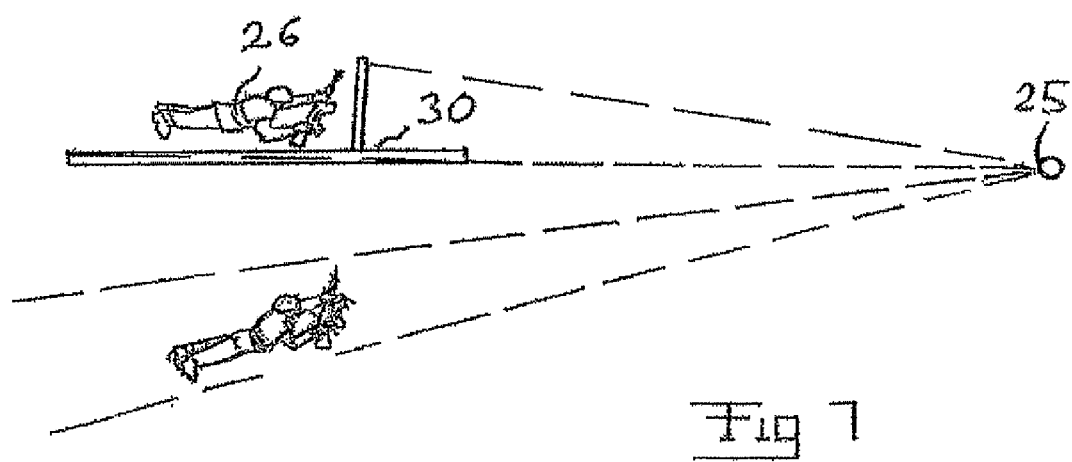

FIG. 7 illustrates in a very schematic way the use of a device 25 according to the present invention in a fixed position simulating for example a sector charge or another weapon discharging directed fire. The device 25 transmits information through a laser lobe that soldiers having a certain location with respect to the device 25 at the moment of the explosion shall be affected. It is shown that a soldier 26 located behind a protection wall 30 shall not be considered to be affected.

In a not shown example the physical sector mine or other weapon discharging direct fire is located in a position separated from the device 20.

The invention is of course not in any way restricted to the embodiments described above, but many possibilities to modifications thereof should be apparent to a person with ordinary skill in the art without departing from the basic idea of the invention as defined in the appended claims.

That said elements may be brought between a first and a second state does not exclude the possibility to let them have more such states, for instance more than one first state and/or more than one second state. In the case of micro-mirrors this means that each micro-mirror may be tiltable into more than two different positions for adapting the array to different applications and tasks of the device.

"Diverting" with respect to the function of a micro-mirror may also mean that light which would have been reflected thereby in said first state will in the second state pass the micro-mirror and be absorbed by material therebehind or penetrating that material.

It is pointed out that said two-dimensional array of elements may be combined with many types of optical means or systems for light lobe shaping purposes, and only a few of them have been described above and illustrated in the figures.

The invention claimed is:

1. A device arranged to simulate fire effects in military or civilian combat training, said device comprising:
    a light source configured to produce light beams;
    at least one lens and/or at least one mirror through which the light beams pass;
    a control configured to control the light source by pulsing the light source to produce a light lobe formed by the light beams from said light source, the pulsing thereby imparting information to the light lobe;
    a two-dimensional array of elements each element being individually controllable to assume a selected state among at least a first state of letting through said light incident thereupon and a second state of not letting through said light incident thereupon, wherein the control includes a computer program including computer program code that is adapted to individually control said elements of the two-dimensional array to selectively configure a first portion of the elements in the first state and a second portion of the elements in the second state for designing a spatial propagation of said light lobe, thereby differentially conveying the information included in the light lobe to a plurality of locations in front of the light source simultaneously; and
    a plurality of receivers configured to differentially receive the light lobe conveyed through the array of elements and thereby the information included therein to simulate fire effects in military or civilian combat training.

2. The device according to claim 1, wherein said elements are arranged to assume said second state by controlling properties of blocking and/or reflection thereof.

3. The device according to claim 1, wherein said elements are arranged to assume said second state by letting through said light in a direction different from said main direction.

4. The device according to claim 3, wherein said elements are arranged to assume more than two states and wherein each state is associated to a predetermined deflection direction.

5. The device according to claim 1, wherein said control unit includes a computer program including computer program code adapted to control said elements of said two-dimensional array.

6. The device according to claim 1, wherein said at least one lens and/or at least one mirror is configured to shape said light lobe.

7. The device according to claim 1, wherein said at least one lens and/or at least one mirror comprises a Fresnel lens.

8. The device according to claim 1, wherein said at least one lens and/or at least one mirror comprise an optical system of lenses and/or mirrors.

9. The device according to claim 1, wherein said at least one lens and/or at least one mirror comprise a diffractive optical element through which the light beams pass.

10. The device according to claim 1, wherein said light source control is controlled by the control unit so as to provide a light lobe having a selected range.

11. The device according to claim 1, further comprising:
    a tiltable mirror arranged in a path of said light lobe and
    a mirror control adapted to control said mirror to tilt in a predetermined way.

12. The device according to claim 11, wherein operation of said control unit and of said mirror control are coordinated.

13. The device according to claim 1, wherein said light source and said array are adapted to make substantially the entire array to be hit by light beams from the light source simultaneously.

14. The device according to claim 1, wherein said two-dimensional array of elements is a liquid crystal array and said first state and said second state of the elements thereof are a state in which the elements are transparent to said light and a state in which the elements are not transparent to said light, respectively.

15. The device according to claim 1, wherein said elements are micro-mirrors tiltably arranged in an array, and wherein said first state of the micro-mirrors lets through in said main direction by reflecting the light incident thereupon in a predetermined direction and the second state does not let light through in said main direction by diverting said light so that dark regions will be created thereby in a cross-section of said lobe.

16. The device according to claim 1, wherein said two-dimensional array is arranged to provide a simulated ballistic ammunition trajectory.

17. The device according to claim 16, wherein the device is configured to transmit information to receivers of detection devices on players participating in a military or civilian combat training.

18. The device according to claim 1, wherein the device is configured to simulate an effect of a sector charge from a fixed position in a military or civilian exercise of combat.

19. A computer program, comprising:
    a non-transitory computer readable medium; and
    computer program instructions recorded on the computer readable medium and executable by a processor for controlling a device to simulate fire effects in military or civilian combat training, wherein said device comprises a light source configured to produce light beams, at least one lens and/or at least one mirror through which the light beams pass, and a control adapted to control the light source by pulsing the light source to produce a light lobe formed by the light beams from said light source, wherein the pulsing thereby imparts information to the light lobe, a two-dimensional array of elements, each element being individually controllable to assume a selected state among at least a first state of letting through said light incident thereupon and a second state of not letting through said light incident thereupon, the control being adapted to individually control said elements of the two-dimensional array to selectively configure a first portion of the elements in the first state and a second portion of the elements in the second state for designing a spatial propagation of said light lobe, thereby differentially conveying the information included in the light lobe to a plurality of locations in front of the light source simultaneously, and a plurality of receivers configured to differentially receive the light lobe conveyed through the array of elements and thereby the information included therein to simulate fire effects in military or civilian combat training, wherein the computer program instructions are for making the computer or processor control at least the operation of said control to direct the light lobe from the light source and individually control each element of the two-dimensional array of elements.

20. A method for simulating fire effects in military or civilian combat training, the method comprising:

directing a light lobe formed of information-containing light beams from a light source through at least one lens and/or at least one mirror toward a light source control comprising a two-dimensional array of elements, wherein the light source is pulsed to impart information in the lobe;

individually controlling each element of the two-dimensional array of elements to selectively configure a first portion of the elements in a first state of letting through said light incident thereupon and a second portion of the elements in a second state of not letting through said light incident thereupon, thereby designing a spatial propagation of said light lobe to differentially convey the information-containing light lobe to a plurality of locations in front of the light source simultaneously; and differentially receiving the information-containing light lobe conveyed through the array of elements to simulate fire effects in military or civilian combat training.

* * * * *